US010024119B2

(12) United States Patent
Tejeda et al.

(10) Patent No.: US 10,024,119 B2
(45) Date of Patent: Jul. 17, 2018

(54) THREADED CONNECTION

(71) Applicants: Maximo Tejeda, Houston, TX (US); Maximo Tejeda, Jr., Houston, TX (US); G. Leon Starnes, Houston, TX (US); Terry Dobson, Jr., Houston, TX (US)

(72) Inventors: Maximo Tejeda, Houston, TX (US); Maximo Tejeda, Jr., Houston, TX (US); G. Leon Starnes, Houston, TX (US); Terry Dobson, Jr., Houston, TX (US)

(73) Assignee: Tejas Tubular Products, Inc., Houston, TX (US)

( * ) Notice: Subject to any disclaimer, the term of this patent is extended or adjusted under 35 U.S.C. 154(b) by 457 days.

(21) Appl. No.: 14/268,654

(22) Filed: May 2, 2014

(65) Prior Publication Data

US 2015/0316181 A1 Nov. 5, 2015

(51) Int. Cl.
*F16L 15/06* (2006.01)
*E21B 17/042* (2006.01)
*F16L 15/00* (2006.01)

(52) U.S. Cl.
CPC .......... *E21B 17/042* (2013.01); *F16L 15/002* (2013.01); *F16L 15/06* (2013.01); *F16L 2201/40* (2013.01)

(58) Field of Classification Search
CPC ..... E21B 17/042; F16L 15/001; F16L 15/004; F16L 15/006; F16L 15/009
See application file for complete search history.

(56) References Cited

U.S. PATENT DOCUMENTS

| 4,121,862 | A | * | 10/1978 | Greer | F16L 15/001 285/333 |
| 4,568,113 | A | | 2/1986 | Axtord et al. | |
| 4,616,537 | A | * | 10/1986 | Axford | E21B 17/042 470/176 |
| 4,623,173 | A | | 11/1986 | Honda et al. | |
| 5,029,906 | A | * | 7/1991 | Chelette | E21B 17/042 285/113 |
| 5,105,879 | A | * | 4/1992 | Ross | E21B 33/10 166/195 |
| 7,255,374 | B2 | | 8/2007 | Carcagno et al. | |

(Continued)

OTHER PUBLICATIONS

Tejas Y Enterprise Co., Inc., A Casing Connection for Energy Storage, Solution Mining Research Institute, Meeting Paper, Oct. 16-19, 1983.

*Primary Examiner* — David Bochna
*Assistant Examiner* — James A Linford
(74) *Attorney, Agent, or Firm* — Bushman Werner, P.C.

(57) ABSTRACT

A threaded connection for use on oil field tubular. The connection has a dual tapered thread comprising a dual helical thread having a first, straight threaded portion and a second, angled portion, the threaded connection comprising a pin connection and a box connection both of which have thread-free sections. The thread-free section on the pin and the box are comprised of frustoconical surfaces and cylindrical surfaces. The thread-free section of the pin in addition to having a frustoconical surface and a cylindrical surface has an annular, radially outwardly radiused protrusion which, when the box and the pin connection are made-up is in interference engagement with the frustoconical surface in the box.

10 Claims, 8 Drawing Sheets

(56) References Cited

U.S. PATENT DOCUMENTS

2012/0175846 A1* 7/2012 Hedrick ................ F16L 15/001
                                                    277/314
2015/0008667 A1* 1/2015 Shcherbakov ........ E21B 17/042
                                                    285/334
2015/0145247 A1* 5/2015 Zhu ....................... E21B 17/042
                                                    285/333

* cited by examiner

THREADED CONNECTION

FIELD OF THE INVENTION

The present invention relates to threaded connections and, more particularly, to gas tight threaded connections from use in the completion and production of oil and gas wells.

BACKGROUND OF THE INVENTION

U.S. Pat. No. 4,568,113 ('113 patent) discloses and claims a threaded connection for use in tubular goods of bimetallic construction used in the production of oil and gas. The threaded connection of the '113 patent comprises a continuous helical thread having a first straight, untapered portion and a second, tapered portion. The threaded connection of the '113 patent further comprises a coupling having first and second box connections for receipt of first and second pins. When made up, the noses of the pins either abut and seal on each other or abut against a removable washer disposed intermediate the coupling.

The pin noses of the '113 patent have thread-free sections which, when the connection is made up, engage complementary thread-free sections formed in the box of the connection. This engagement of this thread-free surface ostensibly results in a metal-to-metal seal. Although a commercial version of the threaded connection shown in the '113 patent was marketed, it met with limited success because of the fact that it was not gas tight when subjected to high gas pressures, and cycled between tension and compression. The commercial version is discussed in a paper entitled "A Casing Connection For Energy Storage" present at the Solution Mining Research Institute Meeting, Denver, Colo., Oct. 16-19, 1983.

SUMMARY OF THE INVENTION

In one aspect, the present invention provides a threaded connection comprised of a pin connection and a box connection, both of which have dual threaded portions one of which is straight, the other being tapered.

In another aspect, the present invention provides a threaded connection comprised of a pin connection and a box connection wherein the threads of the pin connection and the box connection are formed from a single helical thread which has a first straight portion and a second tapered portion.

In another aspect, the present invention provides a coupled connection comprising a coupling having first and second box connection ends and first and second pin connections with mating threads, the threads of the pin connection and the box connection being comprised of a single helical thread having a tapered portion and a straight portion.

These and further features and advantages of the present invention will become apparent from the following detailed description, wherein reference is made to the figures in the accompanying drawings.

BRIEF DESCRIPTION OF THE DRAWINGS

FIG. 3A is an enlarged view of DETAIL 3A of FIG. 3.

FIG. 3B is an enlarged view of DETAIL 3B of FIG. 3.

DETAILED DESCRIPTION OF PREFERRED EMBODIMENTS

Figure 1:
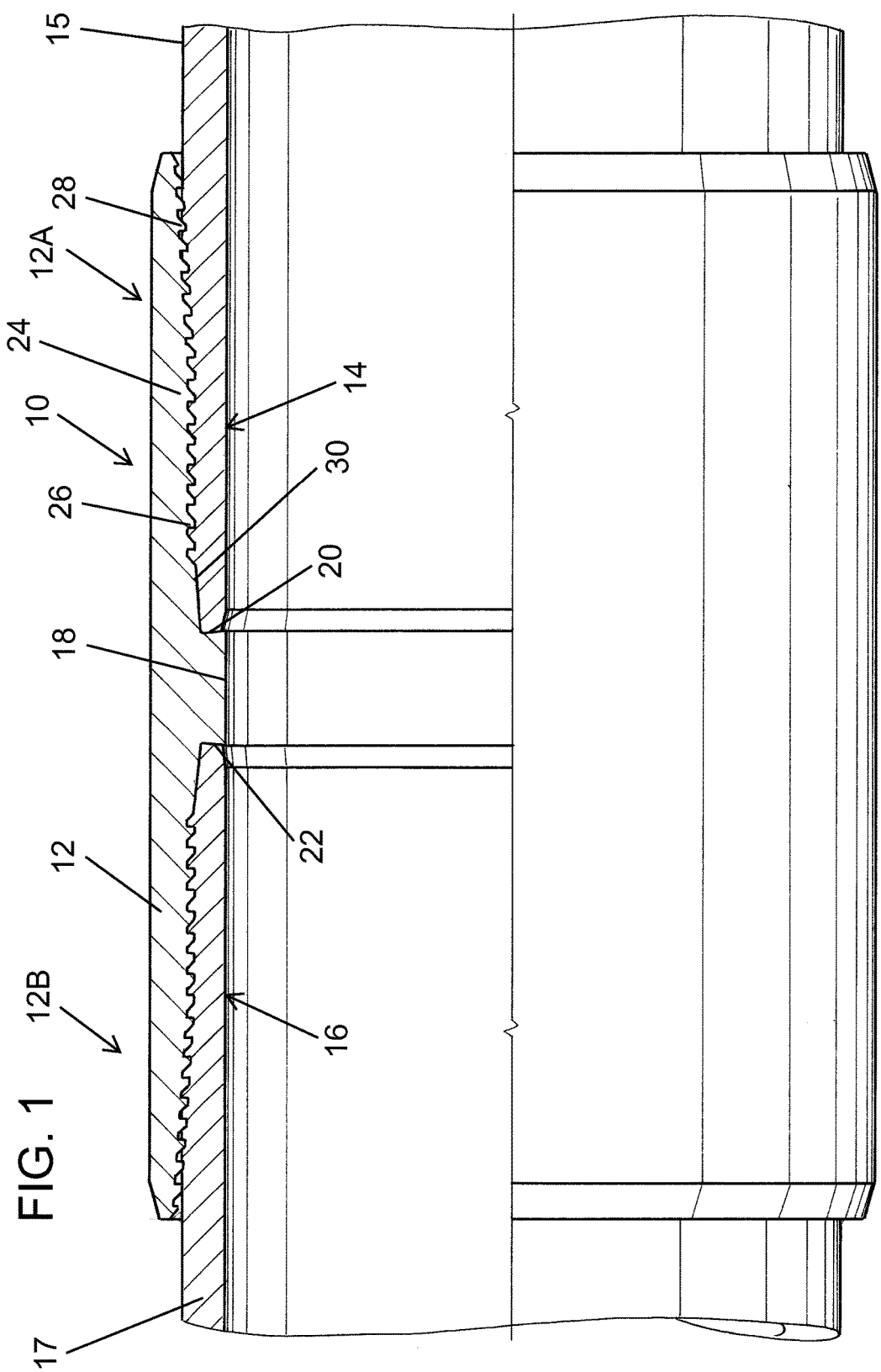
FIG. 1 is an elevational view, partly in section, of one embodiment of the threaded connection of the present invention.
Figure 3:
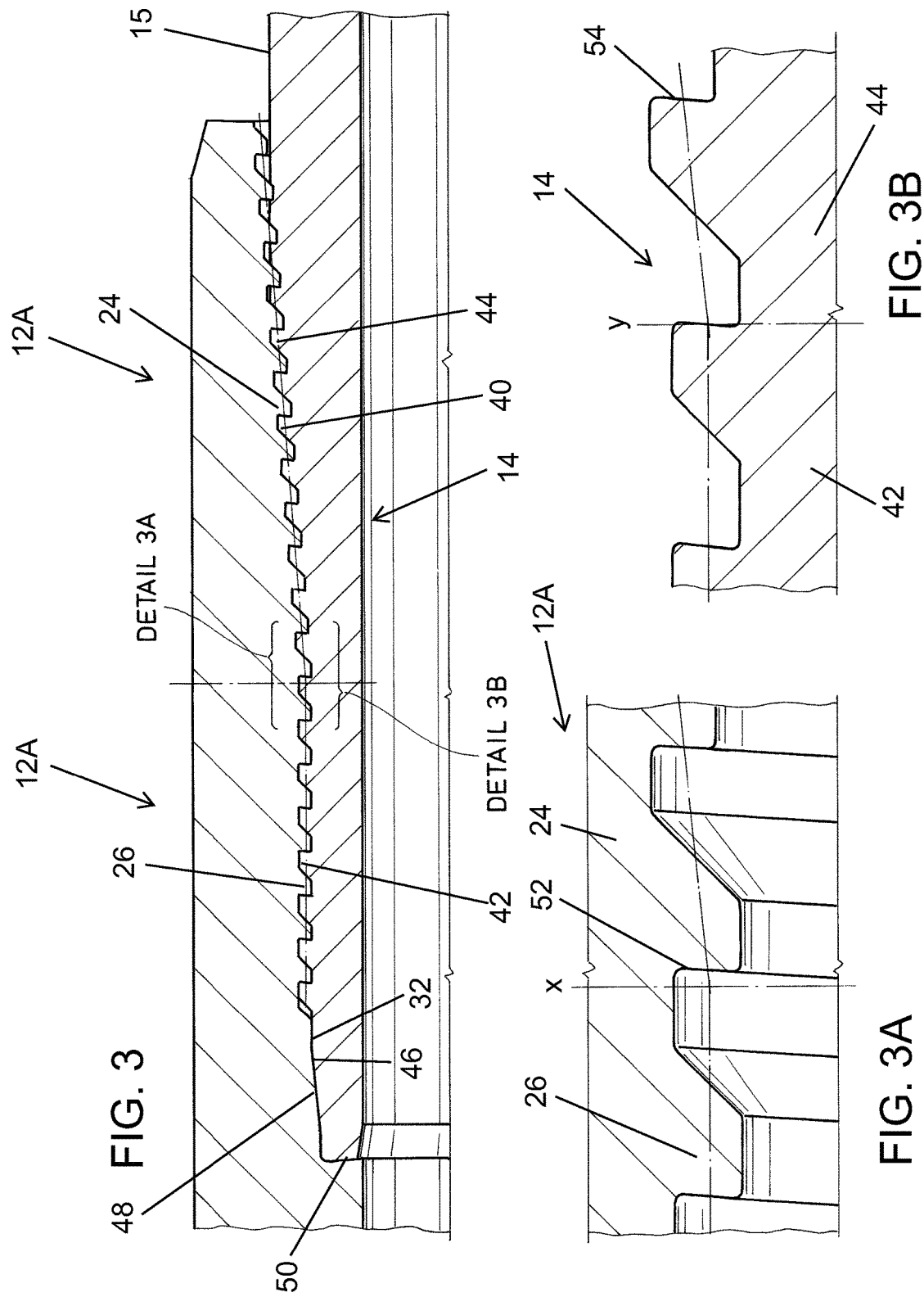
FIG. 3 is an enlarged portion of part of the connection shown in either FIG. 1 or FIG. 2 showing the transition of the thread between a straight portion and a tapered portion.

Referring first to FIGS. 1 and 3, there is shown an embodiment of the threaded connection of the present invention employing a coupled connection. The embodiment shown in FIG. 1 includes a coupling, shown generally as 10, the coupling having a coupling body 12, a first box connection shown generally as 12A and a second box connection shown generally as 12B. The threaded connection further includes a first pin connection shown generally as 14 and a second pin connection shown generally as 16, connections 14 and 16 being connected to tubular members 15 and 17, e.g., casing, respectively. Coupling body 12 has an integrally formed, annular radially inwardly extending rib 18 having a first annular, axially facing torque shoulder 20, and a second, annular, axially facing torque shoulder 22.

Each of the box connections 12A, 12B on coupling 10, only one of which will be described in detail, it being understood that the other box connection is the same, have a threaded portion 24, comprised of a dual, helical thread, i.e., a double start thread, the threaded portion 24 having a first straight, threaded portion 26 and a second angled or tapered threaded portion 28. (see FIG. 3) The reference to straight and angled or tapered, as used herein, is with reference to the angle of the taper of the threads versus an axis coaxial with the O.D. of coupling 10 or in the case of the pin connections 14, 16, an axis concentric with the ID of the pin connections. Coupling body 12 also has a thread-free section 30 comprising a cylindrical surface 32 and a frustoconical surface 34 which intersect at 35.

As best seen with reference to FIG. 3, pin connection 14 has a threaded portion 40 having a first straight, threaded portion 42 and a second, tapered threaded portion 44. As in the case of threaded portion 24, in box connection 12A, threaded portion 40 comprises a single helical thread. Threaded portion 40 of pin connection 14 is complementary to threaded portion 24 of box connection 12A. It should be noted that while the description above is made only with respect to pin connection 14, it is equally applicable to pin connection 16.

Figure 6:
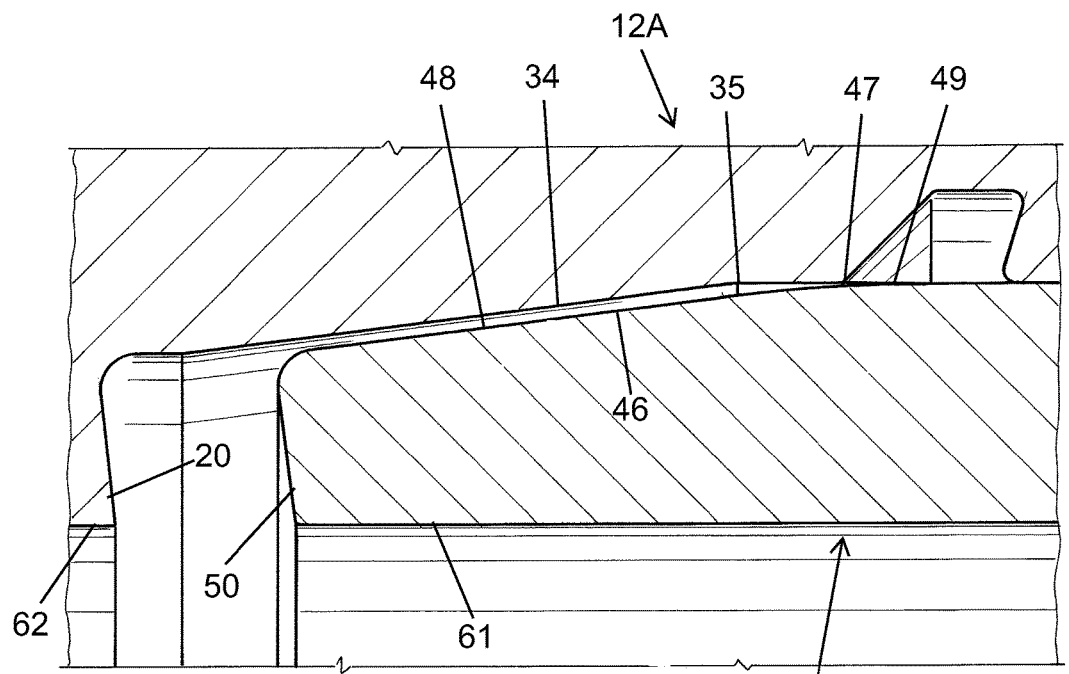
FIG. 6 is an enlarged view of a portion of the threaded connection shown in FIG. 4.
Figure 7:
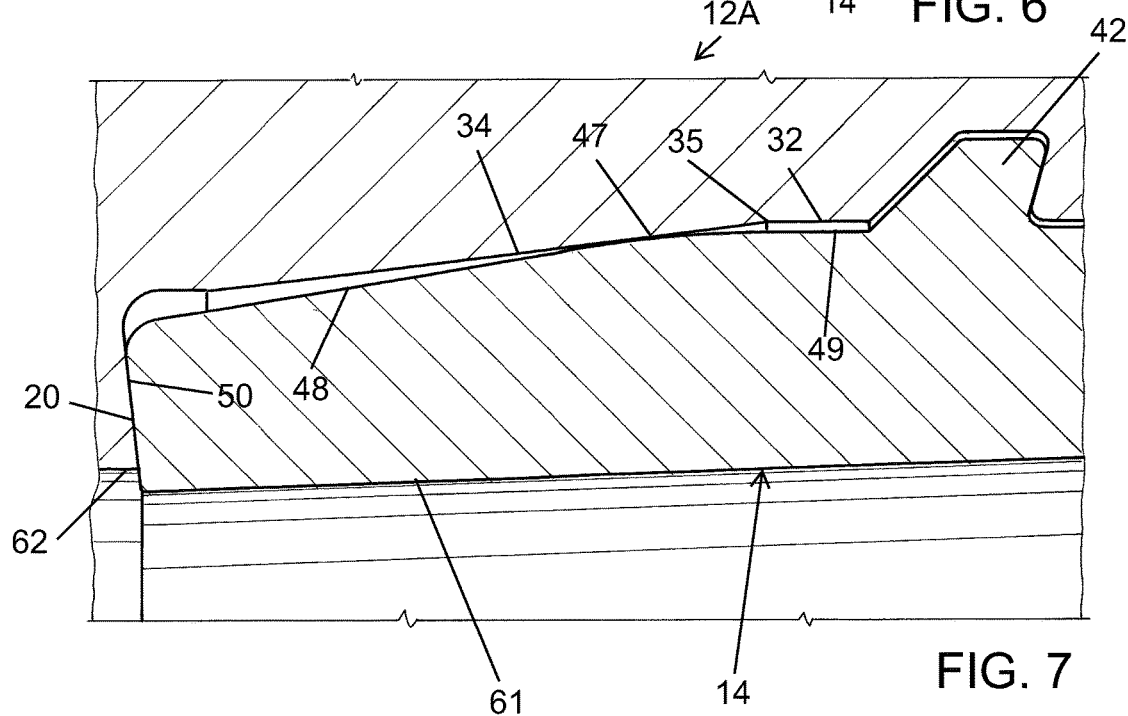
FIG. 7 is an enlarged view of a portion of the threaded connection shown in FIG. 5.

As best seen in FIGS. 6 and 7, pin connection 14 further comprises a thread-free section 46 extending from pin nose 50 toward first threaded portion 42. Thread-free section 46 has a first thread-free section 48 having a frustoconical surface, a second thread-free section 49 having a cylindrical surface which is proximal to first threaded section 42, and a third thread fee section 47 bridging the first and second thread-free sections 46 and 49, respectively. As can be seen in FIG. 7, annularly extending thread-free section 47 smoothly blends into frustoconical surface 48 and cylindrical surface 49. In other words, there is no sharp transition between cylindrical surface 49 and frustoconical surface 48. Rather section 47 forms a smooth arc when viewed in longitudinal cross section which blends into cylindrical surface 49 and frustoconical surface 48.

Figure 2:
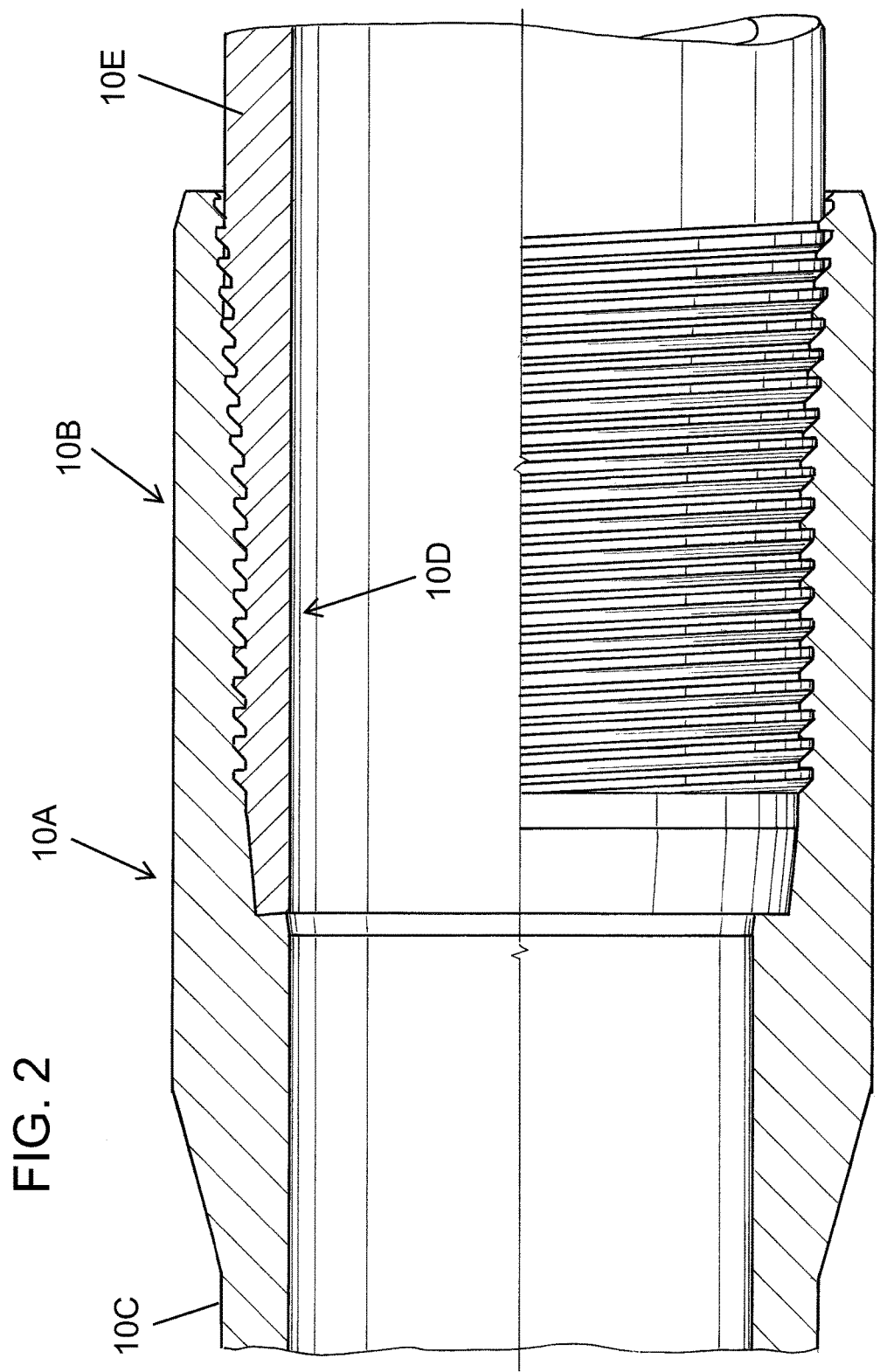
FIG. 2 is an elevational view, partly in section, of another embodiment of the threaded connection of the present invention.

The connection shown in FIG. 2 as 10A has the same characteristics as described above with regard to FIGS. 1, 3 and 4 except connection 10A is a so called integral joint as opposed to a coupled connection as shown in FIG. 1. In this regard there is a box connection 10B on one end of a tubular member 100 and a pin connection 10D on one end of a second tubular member 10E.

As noted above, the threaded portions of the pin connections and box connections of the present invention comprise a continuous helical thread having a first, straight portion and a second, tapered portion, the change from straight to tapered occuring without any loss of pitch. The straight portion of the thread allows the connection to be freerunning during makeup. Further, it helps reduce hoop stress in the box and the pin as opposed to a tapered thread which induces hoop stress due to the taper. At the same time, the tapered portion of the thread provides resistance to back off as for a normal tapered thread, although over a much smaller area.

One advantage of the dual tapered thread of the present invention occurs at the change over from the straight to the tapered portion. At this juncture, reflected in FIGS. 3A and 3B, there is a change in the width of the body of the thread form. In other words, the width of the thread form is larger in the pin connection and smaller in the box connection, which results in a wedging effect which eliminates any helical spiral gap between the stabbing flanks of the thread. Additionally, there is a reduction of the clearance between the roots and the crests of the thread by slightly changing the taper between the box connection and pin connection.

Referring now to FIGS. 3A and 3B, there is shown the transition point between the straight threaded portion 42 to the tapered threaded portion 44 of the pin connection 14 (see FIG. 3B) and the transition between the straight threaded portion 26 and the tapered threaded portion 24 of the box connection 12A, see FIG. 3A. In FIG. 3A, the transition is indicated by the line X while in FIG. 3B the transition is indicated by the line Y.

The threaded section of the pin connection and box connection of the present invention preferably employs a thread form of the hooked type. In other words as seen in FIGS. 3A and 3B respectively, the load flank 53 of the box connection and the load flank 54 of the pin connection are angled slightly with respect to the axis of the connection, the angle being from about 9.75° to about 10.25°, preferably about 10°.

Figure 4:
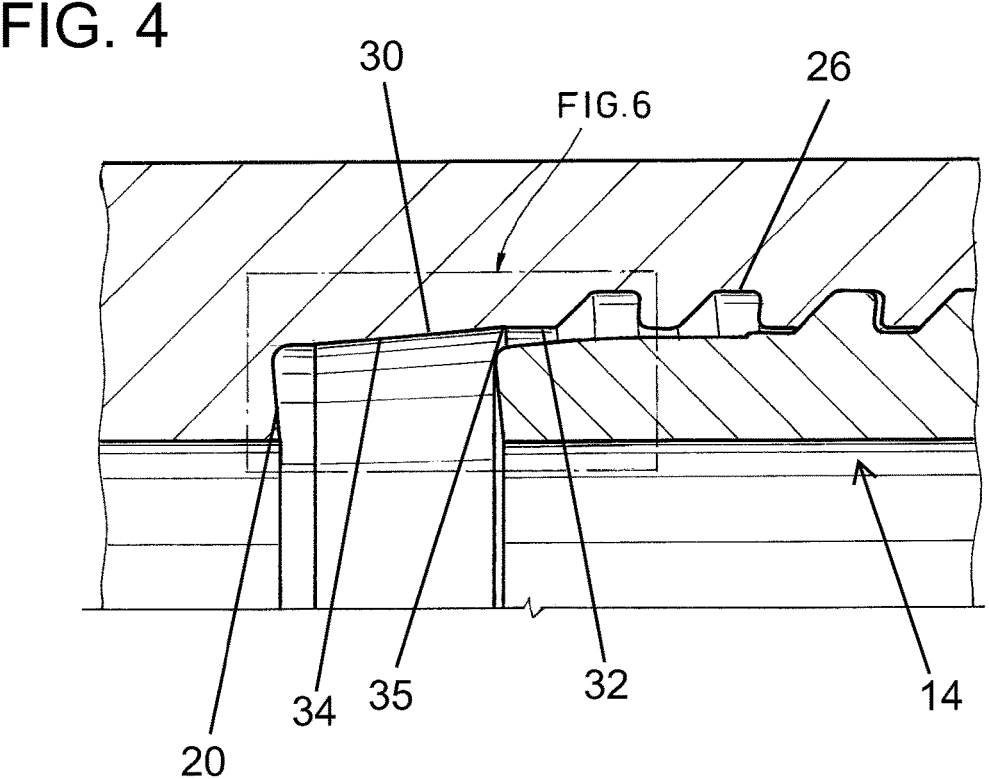
FIG. 4 is a partial, elevational view, partly in section, of the threaded connection of the present invention showing engagement of the box connection and the pin connection prior to make-up.
Figure 5:
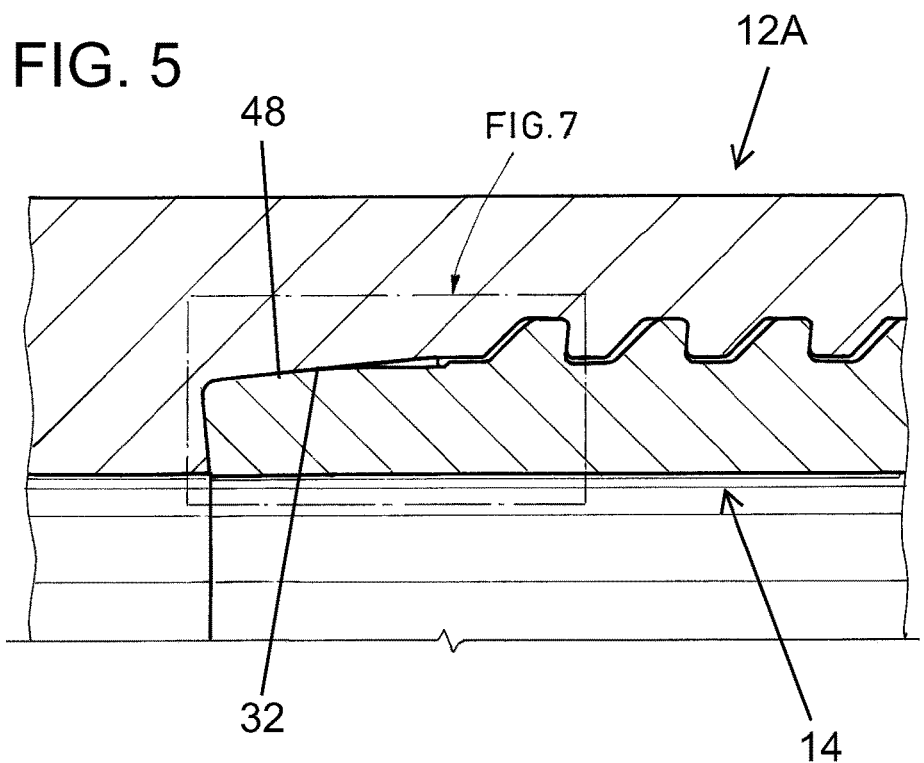
FIG. 5 is a partial, elevational view, similar to FIG. 4 but showing the threaded connection in a fully made-up condition.

Referring now to FIGS. 4 and 5, there is shown the threaded connection of the present invention during make-up (FIG. 4) and after make-up (FIG. 5). With particular reference to FIG. 5, when pin connection 14 is fully made up into box connection 12A, there is interference engagement between the surface of protrusion 47 and box frustoconical surface 34. The manner of interference engagement is critical to the gas tight integrity of the connection and in this regard reference is made to FIGS. 6-8.

With reference now to FIG. 6, the threaded connection of the present invention is shown prior to make-up. As seen in FIG. 6, prior to make-up, the ID 61 of pin member 14 in the ID 62 of box member 12A are generally in register i.e., they are generally equally concentric with a common, long axis passing through pin member 14 and box member 12A. The radius of protrusion 47 can range from about 0.200" to about 0.300 in' but in any event forms a smooth arc when viewed in longitudinal cross-section. In other words, frustoconical surface 48 and cylindrical surface 49 of pin member 14 effectively smoothly merge into the surface of protrusion 47 precluding any sharp intersection between surfaces 48 and 49 on pin member 14, a feature which, as described above, is present in box member 12A. As will be seen hereafter, this is one of the critical features of the threaded connection of the present invention.

Still with reference to FIG. 7 which shows the threaded connection 10 made-up, it can be seen that the end of pin member 14 adjacent nose 50 has been swaged into the ID of the pin member 14. In other words ID 61 of pin member 14 and ID 62 of box member 12A are no longer in register. As will be seen hereafter this swaging which occurs was also present in the prior art connection made in accordance with the teachings of U.S. Pat. No. 4,568,113 and the commercial version thereof and resulted in the connection failing to hold gas pressure once that prior art connection was cycled between compression and tension.

Figure 8:
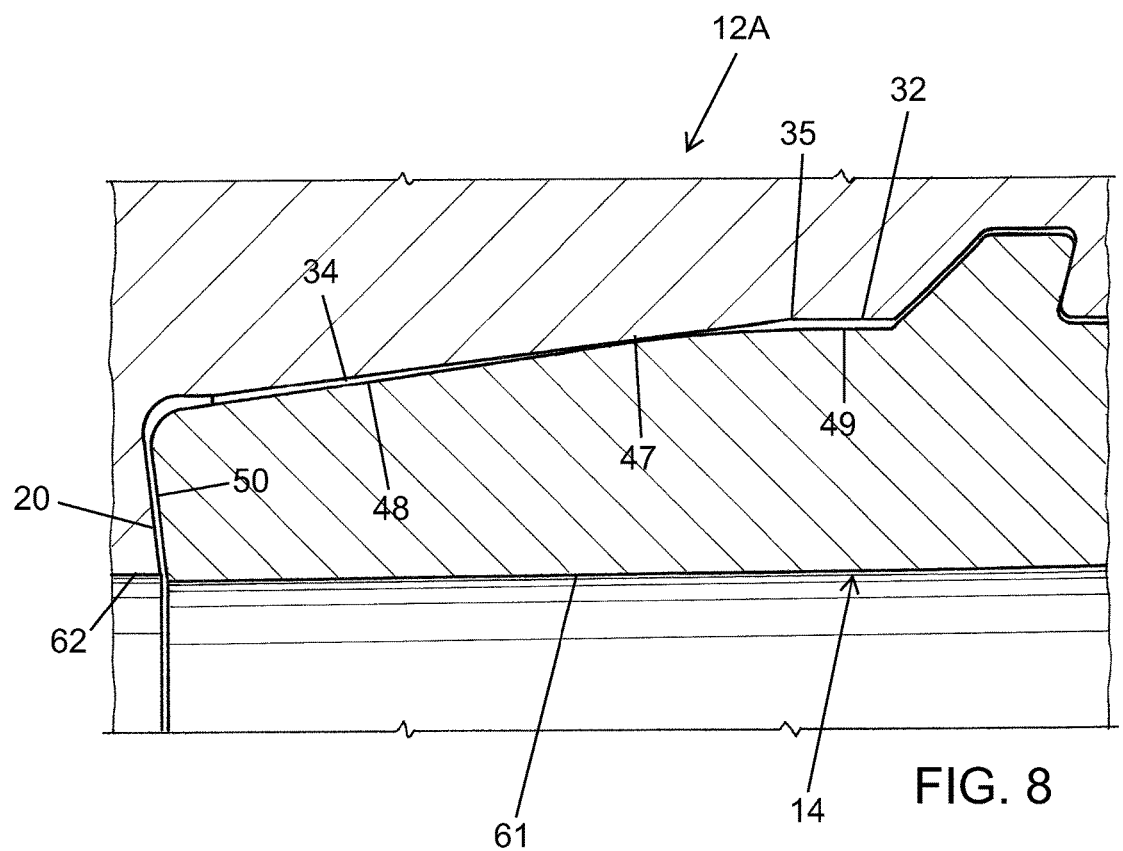
FIG. 8 is a view similar to FIG. 7 but showing the condition of the threaded connection after compression/tension cycling and when in tension and with high, internal gas pressure.

Turning now to FIG. 8, and as noted above this shows the connection of FIGS. 6 and 7 made-up but with the connection in tension and under high internal gas pressure. As can be seen from FIG. 8, even though the connection is in tension and there is high internal gas pressure in the connection, there is still interference engagement between protrusion 47 on pin member 16 and frustoconical surface 34 on box member 12A. FIGS. 7 and 8 also clearly show how protrusion 47 smoothly flows into cylindrical surface 49 and frustoconical surface 48 on pin member 14.

Figure 9:
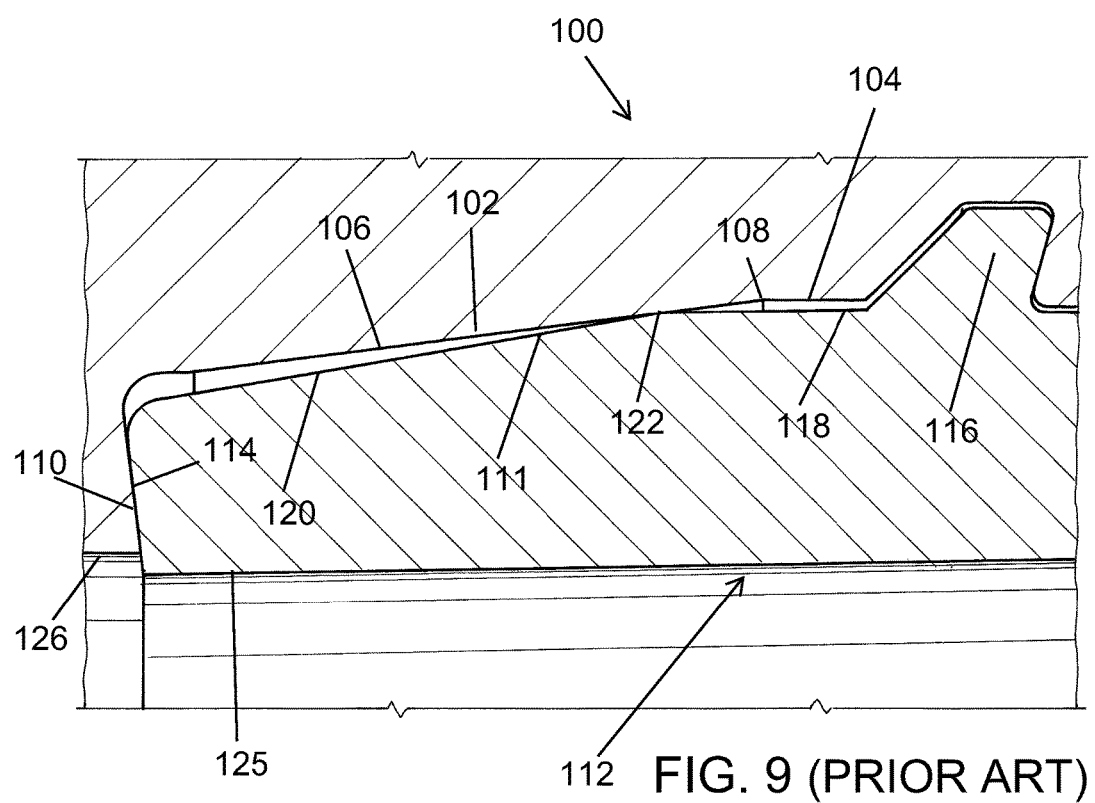
FIG. 9 is a view similar to FIG. 6 but showing the prior art connection according to U.S. Pat. No. 4,568,113 and a commercial version thread.
Figure 10:
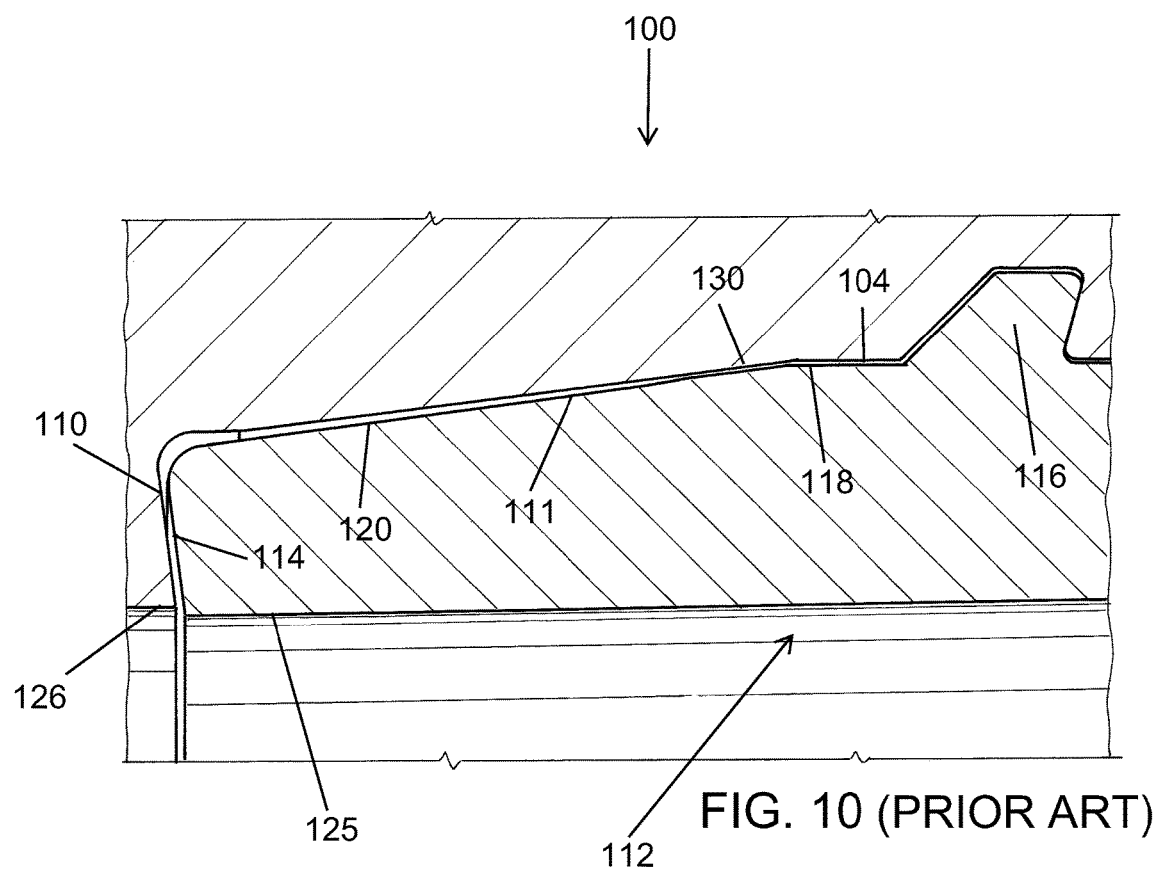
FIG. 10 is a view similar to FIG. 8 but showing the prior art connection of FIG. 9.

Reference is now made to FIGS. 9 and 10 which depict the prior art connection set forth in U.S. Pat. No. 4,568,113 and the commercial version thereof. FIGS. 9 and 10, except for being prior art, correspond to FIGS. 7 and 8 of the connection of the present invention. The prior art connection has a box connection shown generally as 100 box connection 100 having an internal thread-free section 102 characterized by a generally cylindrical surface 104 and a frustoconical surface 106, surfaces 104 and 106 intersecting at 108. It can be seen that the intersection 108 of surfaces 104 and 106 constitutes a sharp demarcation between surfaces 104 and 106 as is the case in the connection of the present invention with the intersection of the cylindrical surface 32 and the frustoconical surface 34 intersect as at 35. Likewise in the case of the threaded connection of the present invention, box connection 100 of the prior art has an annular torque shoulder 110.

Pin connection 112 has a thread-free section 111 which extends between pin nose 114 and first threaded portion 116 of pin connection 112. Thread-free section 111 includes a generally cylindrical surface 118 and a generally frustoconical surface 120 which intersect one another as at 122. Thus if an imaginary plane perpendicular to the long axis of pin 112 was passed through intersection 122, the thread-free section 111 of pin 112 would effectively form line contact with frustoconical surface 106 in box member 100. As can also be seen from FIG. 9, the action of the prior art connection vis-à-vis the swaging action of the pin 112 when the connection is made-up is substantially the same as depicted above with respect to the threaded connection of the present invention. Thus, in the depiction of FIG. 9, the prior art threaded connection has a metal-to-metal seal formed by the interference engagement between the annular surface on pin connection 112 lying on the line contact noted above i.e., the interference engagement between intersection 122 and frustoconical surface 106 on box connection 100. The swaging action can be seen by the fact that the ID 125 of pin connection 112 and the ID 126 of the box connection 100 are not in register as is the case with the threaded connection of the present invention.

With reference now to FIG. 10, there is depicted the condition of the prior art connection shown in FIG. 9 after the connection has been cycled between compression and tension and subjected to high internal gas pressure. As can be seen, there is no longer any interference between any portion of the thread-free section 102 of the box connection 100 and of thread-free section 111 of pin connection 112. Rather, as can be seen there is now an annular gap 130 between the thread-free section 102 and 100. As can be seen in FIG. 10 this results in an axial effective extrusion of the surface 111 of pin connection 112 both towards threaded portion 116 and pin nose 114.

To demonstrate the marked and unexpected result achieved by the threaded connection of the present invention as opposed to the prior art connection, comparative tests were conducted on a connection made in accordance with the teachings of the prior art discussed above and a connection made in accordance with the present invention. In both tests, the pipe which made-up the prior art connection and the threaded connection of the present invention was (size) 20 lb pipe. Once the connections were tightened to the desired torque, they were sealed and internal gas pressure raised to 15,081 PSI, then the pipe was filled with water, then internal pressure was increased until the pipe burst at 18,650 PSI. Each of the connections was then cycled between compression and tension. It was found that after each cycling, the prior art connection could not pass a 60% compression load test where as the connection of the present invention did pass a 95% compression load test.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A threaded connection comprising:
a pin connection having an O.D., a long axis coaxial with said O.D., and a pin end, said pin connection comprising an externally threaded portion having a first threaded portion with a substantially zero angle of thread taper with respect to said long axis of said pin connection and a second threaded portion having an angle of thread taper of from about 4.722° to about 4.807° with respect to said long axis of said pin connection, said first and second threaded portions of said pin connection being formed by a continuous helical thread, said pin connection having a pin nose on said pin end, there being a first pin thread-free section on said pin connection extending from said pin nose to about said first thread of said first threaded portion of said pin connection, said pin thread-free section having a first thread-free section forming an external pin cylindrical surface proximal said first threaded section of said pin connection and extending axially toward said pin nose, a second thread-free section extending from said pin nose axially toward said first threaded portion said second thread-free section having a pin frustoconical surface adjacent said pin nose, and a third thread free-section bridging said pin frustoconical surface and said pin cylindrical surface, said third thread-free section forming a smooth, annularly extending radiused arc when viewed in longitudinal cross-section, said radiused arc having a radius of from 0.200 to 0.300 inches;
a box connection for threadedly receiving said pin connection, said box connection comprising an internal threaded portion having first and second internal threaded portions complementary to said first and second external threaded portions of said pin connection, said internal threaded portion of said box connection being formed by a continuous helical thread, said box connection having an annular, internal shoulder, there being a box thread-free section extending from said shoulder to the first threaded portion of said box connection, said box thread-free section including an internal, box cylindrical surface proximal said first threaded portion of said box connection and extending axially toward said shoulder, at least a portion of said box thread-free section including an internal, box frustoconical surface extending from proximal said shoulder and intersecting said box cylindrical surface; and
said pin nose engaging said annular shoulder and said third thread-free section being in interference engagement with said box frustoconical surface when said threaded connection is made-up, said interference engagement upon make-up resulting in radially inward swaging of said first thread-free section of said pin connection proximal said pin nose.

2. The threaded connection of claim 1, wherein said box connection comprises a coupling.

3. The threaded connection of claim 2, wherein said coupling comprises a coupling body having a first end and a second end.

4. The threaded connection of claim 3, wherein there is a first box connection formed in said first end of said coupling body, and a second box connection formed in said second end of said coupling body.

5. The threaded connection of claim 3, wherein said coupling body has a first end face and a second end face and an axial, generally cylindrical bore extending from said first end face to said second end face, said body having a generally centrally disposed, radially inwardly projecting annular rib forming first and second said annular, internal shoulders in said first and second box connections.

6. The threaded connection of claim 5 wherein said first and second annular, internal shoulders comprises torque shoulders.

7. The threaded connection of claim 1, wherein said box connection is on a first end of a first tubular member and said pin connection is on a first end of a second tubular member.

8. The threaded connection of claim 1, wherein the threads of said threaded portion are hook threads.

9. The thread connection of claim 1, wherein said connection comprises a double-start thread.

10. A threaded connection comprising:

a pin connection having an O.D., a long axis coaxial with said O.D., and a pin end, said pin connection comprising an externally threaded portion having a first threaded portion with a substantially zero angle of thread taper with respect to said long axis of said pin connection and a second threaded portion having an angle of thread taper of from about 4.722° to about 4.807° with respect to said long axis of said pin connection, said first and second threaded portions of said pin connection being formed by a continuous helical thread, said pin connection having a pin nose on said pin end, there being a first pin thread-free section on said pin connection extending from said pin nose to about said first thread of said first threaded portion of said pin connection, said pin thread-free section having a first thread-free section forming an external pin cylindrical surface proximal said first threaded section of said pin connection and extending axially toward said pin nose, a second thread-free section extending from said pin nose axially toward said first threaded portion said second thread-free section having a pin frustoconical surface adjacent said pin nose, and a third thread free-section bridging said pin frustoconical surface and said pin cylindrical surface, said third thread-free section forming a smooth, annularly extending radiused arc when viewed in longitudinal cross-section, said radiused arc having a radius of from about 0.200 to about 0.300 inches;

a box connection for threadedly receiving said pin connection, said box connection comprising an internal threaded portion having first and second internal threaded portions complementary to said first and second external threaded portions of said pin connection, said internal threaded portion of said box connection being formed by a continuous helical thread, the width of the threads formed on the pin connection being larger than the width of the threads formed on the box connection at the change over from the first threaded portion to the second threaded portion, said box connection having an annular, internal shoulder, there being a box thread-free section extending from said shoulder to the first threaded portion of said box connection, said box thread-free section including an internal, box cylindrical surface proximal said first threaded portion of said box connection and extending axially toward said shoulder, at least a portion of said box thread-free section including an internal, box frustoconical surface extending from proximal said shoulder and intersecting said box cylindrical surface; and said pin nose engaging said annular shoulder and said third thread-free section being in interference engagement with said box frustoconical surface when said threaded connection is made-up, said interference engagement upon make-up resulting in radially inward swaging of said thread-free section of said pin connection proximal said pin nose.

\* \* \* \* \*